No. 721,580. PATENTED FEB. 24, 1903.
D. LUBIN.
POWER PROPELLED AGRICULTURAL IMPLEMENT.
APPLICATION FILED JUNE 25, 1902.
NO MODEL. 3 SHEETS—SHEET 3.

WITNESSES:
INVENTOR
David Lubin
BY
ATTORNEYS.

UNITED STATES PATENT OFFICE.

DAVID LUBIN, OF NEW YORK, N. Y.

POWER-PROPELLED AGRICULTURAL IMPLEMENT.

SPECIFICATION forming part of Letters Patent No. 721,580, dated February 24, 1903.

Application filed June 25, 1902. Serial No. 113,115. (No model.)

*To all whom it may concern:*

Be it known that I, DAVID LUBIN, a citizen of the United States, and a resident of the city of New York, borough of Manhattan, in the county and State of New York, have invented a new and Improved Power-Propelled Agricultural Implement, of which the following is a full, clear, and exact description.

This invention relates to improvements in agricultural implements operated by a motor carried thereon; and the object is to provide a device of this character so arranged that while the motor is in continuous operation it will serve alternately to propel the machine and to operate the digging-tool, thus making it possible to employ a motor of much less power than would be required to propel the machine and operate the digger at the same time.

I will describe a power-propelled agricultural implement embodying my invention and then point out the novel features in the appended claims.

Reference is to be had to the accompanying drawings, forming a part of this specification, in which similar characters of reference indicate corresponding parts in all the figures.

Figure 1:
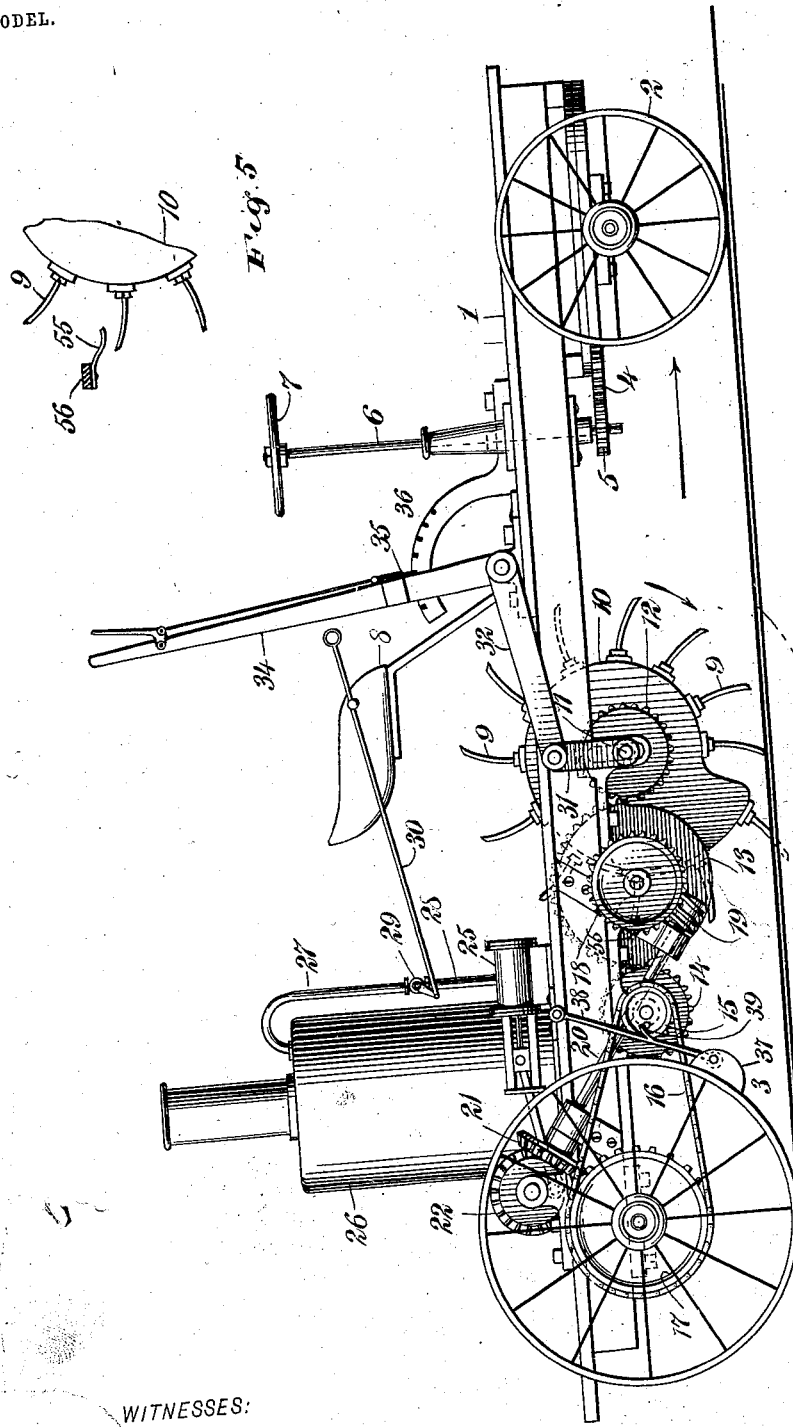
Figure 2:
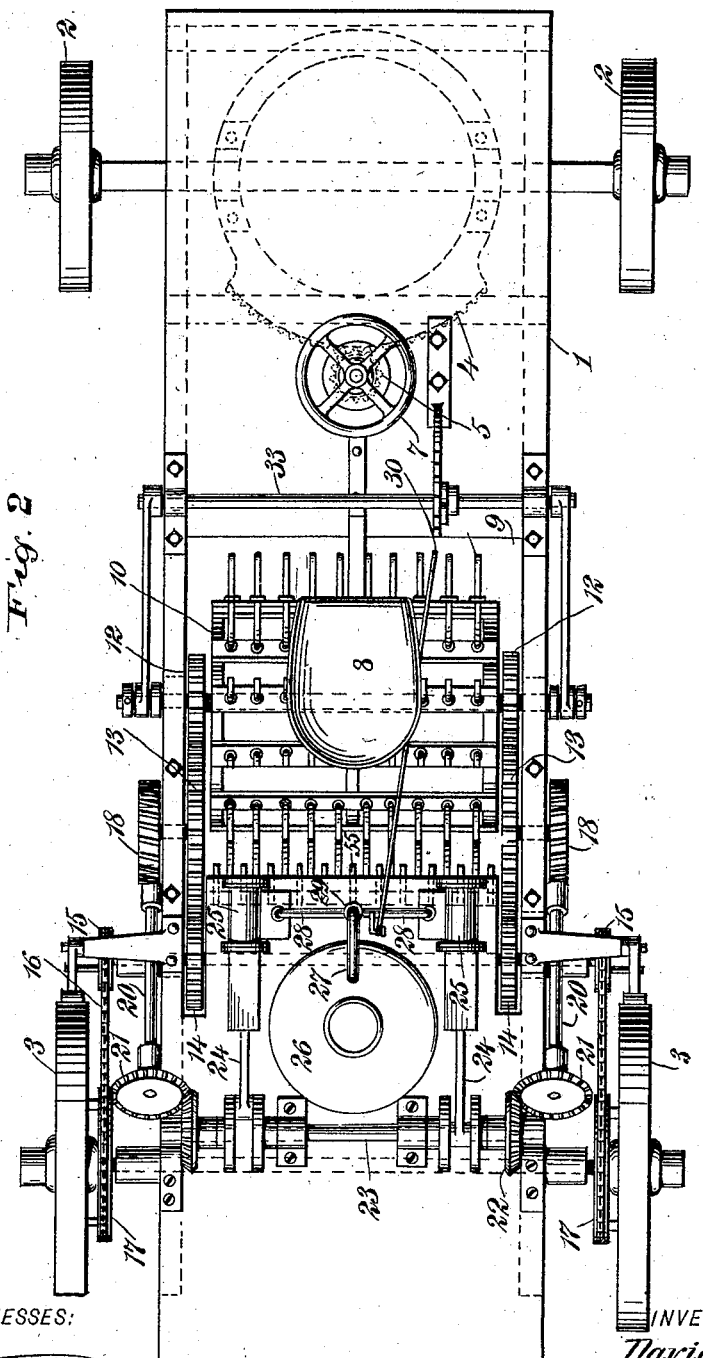
Figure 3:
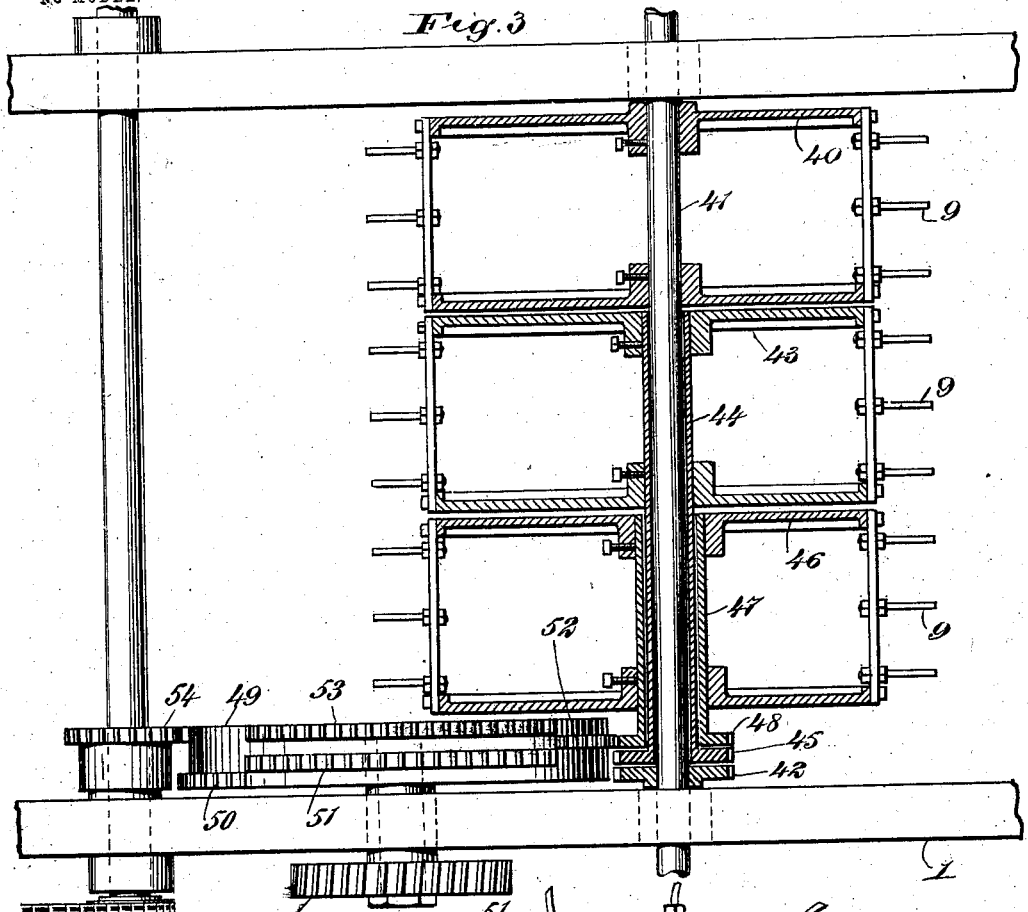
Figure 4:
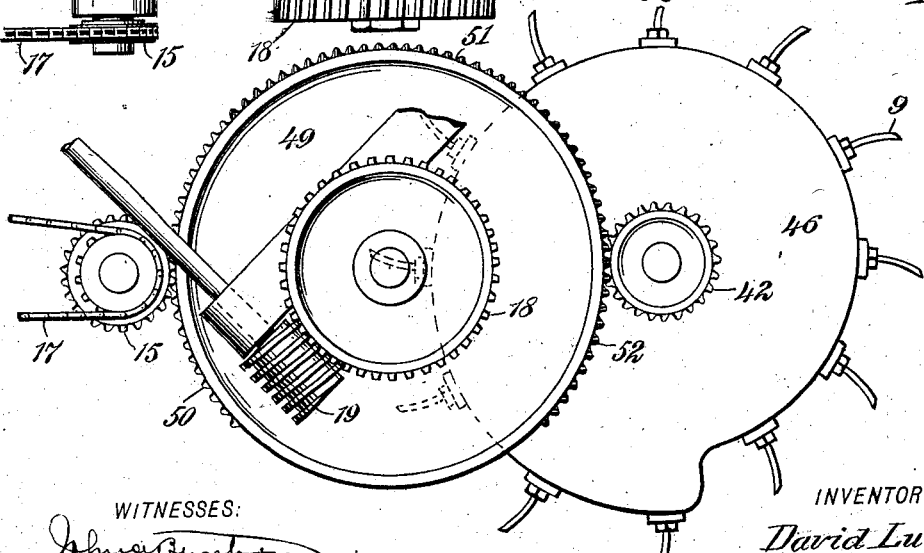

Figure 1 is a side elevation of a power-propelled agricultural implement embodying my invention. Fig. 2 is a plan view thereof. Fig. 3 is a sectional plan showing a modification. Fig. 4 is an end view thereof, and Fig. 5 is a detail showing breaking-tines employed.

Referring to the drawings, 1 designates the body of a carriage mounted on the front wheels 2 and the rear wheels 3. As a means for steering the carriage I have here shown a segment-rack 4 as attached to the front axle and engaged by a pinion 5, mounted on a shaft 6, extended upward through the body and having an end wheel 7, this steering-shaft being forward of the seat 8. Mounted to rotate on the carriage are several series of digging-teeth. As here shown the digging-teeth 9 are removably attached to a cylinder 10, mounted on a shaft 11. This cylinder 10 has a gradually-increasing diameter or spiral peripheral surface. The object of this construction is to permit the employment of the several teeth of the same length by providing for variations in projection from the axis of the cylinder, so that the successive series of teeth will dig into the ground—that is, when the cylinder is rotated the first series of teeth, that have the least projection from the axis, will dig a short distance into the ground and then the next series of teeth, which have a slightly-greater projection, will dig farther into the ground, and this will continue until the ground is dug to a sufficient depth by the last series of teeth which have the greatest projection from the axis. It is obvious that instead of this construction teeth of varying lengths might be extended directly from the shaft; but such construction would involve a greater expense in the construction of the machine or in making repairs thereto.

Mounted on the ends of the shaft 11 are pinions 12, designed to be engaged by the teeth of mutilated gears 13, and the teeth of these gears 13 are also designed to engage with pinions 14, on the shaft of which are sprocket-pinions 15, and from these sprocket-pinions chains 16 extend around sprocket-wheels 17, attached to the hubs of the rear wheels 3. On the shaft of the mutilated gears are worm-wheels 18, engaged by worms 19 on shafts 20, which extend rearward at an upward angle and have on their upper ends bevel-gears 21, meshing with bevel-gears 22, attached to a crank-shaft 23. The cranks of the crank-shaft have link connections 24 with the piston-rods of the engines 25, to which steam is supplied from a boiler 26, mounted on the carriage through the pipe 27 and the branch pipes 28. From a valve 29 in the pipe 27 a shifting-rod 30 extends forward to the operator's seat.

While I have shown a steam-motor in connection with the machine, it is obvious that the invention is not confined thereto, as a motor having another motive agent may be employed.

In operation the mutilated gears are kept in constant rotation by the motor. When the teeth of the mutilated gears engage with the pinions 14, the carriage will be moved forward a short distance, the digging-tool remaining stationary as to rotary movement. Upon the teeth of the mutilated gears leaving the pinions 14 they will engage with the pinions 12 and impart rotary motion to the digging-tool, so that the several series of teeth will be forced through the ground in the manner above described. After a complete rotation of the digging-tool the teeth of the mutilated gears will engage with the pinions 14 and move the machine forward for the next operation of the digging-tool.

To elevate the digging-tool when moving from field to field or when it is not desired to operate the machine, the said digging-tool has its bearings in hangers 31, attached to the arms 32, extended from a rock-shaft 33, on which is an operating-lever 34, which carries a dog 35 for engaging with a segment-rack 36.

While the digging-tool is in operation in the ground, it is necessary that the carriage should be held stationary, and if the weight of the carriage is not sufficient for this purpose I may employ a suitable brake. I have here shown braking-shoes 37 for engaging with the rear wheels, these braking-shoes being supported on swinging rods 38, designed to be engaged by spring-yielding tappets 39, mounted on the sprocket-pinions 15. In the operation when the machine comes to a standstill the sprocket-wheels 15 will be in such position as to engage the tappets with the rods 38, pressing the shoes 37 into engagement with the wheels. Of course after the digging operation and when the parts are in position to move the carriage forward the tappets by yielding will move out of engagement with the rods 38.

In Fig. 3 I have shown a machine designed for operating for a greater width in the ground than is possible with the machine first described—that is, I provide a plurality of digging-tools arranged side by side and operating independently one of the other and in succession, so that a motor of comparatively low horse-power may effectually operate the machine. The first cylinder 40 is mounted on a shaft 41, provided with a pinion 42. A cylinder 43 is mounted on a sleeve 44, provided with a pinion 45, and a cylinder 46 is mounted on a sleeve 47, having a pinion 48. The sleeve 44 of course surrounds the shaft 41, while the sleeve 47 surrounds the sleeve 44. A driving-wheel 49 is designed to operate the several digging-tools successively and also to move the carriage forward. This driving-wheel 49 is operated by a worm-gear, as in the example first described, and it has staggered sets of teeth 50, 51, and 52, each set of teeth extending for one-quarter the circumference of the wheel. Arranged at one side of the teeth 51 is another set of teeth 53 for engaging with the pinion 54 for moving the carriage forward through the sprocket mechanism, as first described. In operation when the carriage is at a standstill the teeth 50 by engaging with the pinion 42 will rotate the first digging device 40. Then the teeth 51 will come in engagement with the pinion 45, operating the digging-tool 43, and then the teeth 52 by engaging with the pinion 48 will operate the digging-tool 46. The teeth 53 will now come in engagement with the gear 54 and cause the carriage to move forward. There will be no operation of the digging-tools at this time, because there is a blank space on the driving-wheel opposite the teeth 51 and 52.

In coöperation with the teeth I may employ breaking-tines 55, supported on a bar 56, rearward of the digging-tool. These tines are designed to catch clods of earth carried up by the teeth and finely pulverize the same, and they are of resilient metal, so as to yield to permit the passage of a stone or stick should such obstruction be carried up by the teeth. While I have shown the tines as curved downward, they may in some cases be turned upward.

By the operation of a machine of this character there is no troweling-like or rubbing action to smooth and pack the earth below the surface, which is the case with plows or similar implements drawn directly through and practically parallel with the earth-plane, and therefore the penetration of rain or moisture to a considerable depth is not prevented, and, further, a free circulation of air, gases, and moisture is permitted, resulting in that kind of tillage by machinery usually designated as "intensive farming," which is at present done by hand labor.

Having thus described my invention, I claim as new and desire to secure by Letters Patent—

1. In an implement of the character described, a carriage, a motor, a digging-tool supported on the carriage, and gearing operated by the motor for alternately propelling the carriage and operating the digging-tool.

2. In an implement of the character described, a carriage, a motor mounted thereon, a digging-tool supported on the carriage, and a gearing operated by the motor for alternately propelling the carriage and imparting a rotary movement to the digging-tool.

3. An agricultural implement, comprising a carriage, a rotary part mounted on the carriage, several series of digging-teeth mounted on said rotary part, the several series being successively projected a greater distance from the axis of the rotary part, and means for operating the rotary part.

4. An agricultural implement, comprising a carriage, a rotary part mounted on the carriage and having a gradually-increasing diameter, several series of teeth mounted on said rotary part, and means for imparting motion to said rotary part.

5. An agricultural implement, comprising a carriage, a rotary digging-tool mounted on the carriage, a pinion on the shaft of said tool, pinions having driving connection with the rear wheels of the carriage, a mutilated gear for alternately operating said pinions, a motor on the carriage, and a driving connection between said motor and the mutilated gear.

6. In an agricultural implement, a carriage, a rotary digger mounted on the carriage and comprising several series of teeth, the several series progressively projecting for greater distances from the axis of the digger, pinions mounted on the shaft of the digger, mutilated gear-wheels adapted for engagement with said pinions, rear wheels on the shaft of the mutilated gear-wheels, a motor, worms engaging with the worm-wheels and operated by the motor, and gear-wheels having driving connection with the rear wheels of the carriage and adapted for engagement with the teeth of the mutilated gears.

7. In an implement of the character described, a carriage, a rotary digging-tool thereon, having teeth, breaking-tines coacting with the teeth, and a motor for alternately operating the tool and moving the carriage.

8. In an agricultural implement, a carriage, an operating digging-tool thereon, a motor for alternately moving the carriage and operating the digging-tool, and means for raising and lowering the digging-tool.

9. In an implement of the character described, a carriage, a plurality of rotary digging-tools mounted on the carriage, a motor on the carriage, and means operated by the motor for successively rotating the digging-tools and moving the carriage forward.

In testimony whereof I have signed my name to this specification in the presence of two subscribing witnesses.

DAVID LUBIN.

Witnesses:
JNO. M. RITTER,
C. R. FERGUSON.